(12) United States Patent
Akitomo et al.

(10) Patent No.: US 6,723,199 B1
(45) Date of Patent: Apr. 20, 2004

(54) LAMINATION METHOD

(75) Inventors: Masaharu Akitomo, Taki-gun (JP); Tetsurou Koyama, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 74 days.

(21) Appl. No.: 09/593,007

(22) Filed: Jun. 13, 2000

Related U.S. Application Data

(62) Division of application No. 09/153,345, filed on Sep. 15, 1998, now Pat. No. 6,190,489.

(30) Foreign Application Priority Data

Sep. 19, 1997 (JP) .............................. 9-255574
Sep. 11, 1998 (JP) ........................... 10-258123

(51) Int. Cl.$^7$ .............................................. B32B 31/00
(52) U.S. Cl. ................. 156/248; 427/146; 427/96; 430/259; 156/238; 156/253; 156/254; 156/256; 156/257; 156/268; 156/270; 156/271; 156/344
(58) Field of Search ................................ 156/238, 521, 156/256, 247, 522, 248, 270, 271, 239, 240, 217, 344, 267, 253, 257, 254, 268; 430/256, 259; 427/146, 96

(56) References Cited

U.S. PATENT DOCUMENTS 4,528,055 A * 7/1985 Hattemer .................. 156/247
5,307,716 A   5/1994 Onishi et al. ................. 83/488
5,441,846 A * 8/1995 Nagate et al. .............. 430/259
6,190,489 B1  2/2001 Akitomo et al. ............. 156/238

FOREIGN PATENT DOCUMENTS

| JP | 62-199328 | 12/1987 |
| JP | 05338041  | 12/1993 |
| JP | 06023689  | 2/1994  |
| JP | 06278936  | 10/1994 |
| JP | 07157187  | 6/1995  |
| JP | 08183146  | 7/1996  |

* cited by examiner

*Primary Examiner*—Linda Gray
(74) *Attorney, Agent, or Firm*—Nixon & Vanderhye P.C.

(57) ABSTRACT

A lamination method, which is a method in which a dry resist film, formed by providing a color resist layer on a base film, is cut based upon the length of a substrate in the feeding direction, and press-bonded onto the substrate, and then the color resist layer is transferred onto the substrate by separating the base film, is provided with the following steps: in the cutting process, cutting the film so that the rear end of the dry resist film, after the press-bonding, extrudes from the rear end of the substrate by a predetermined width; and cutting the dry resist film again at a position inside the rear end of the substrate prior to separating the base film after the dry resist film has been press-bonded so as to eliminate the portion of the dry resist film extruding from the substrate.

20 Claims, 16 Drawing Sheets

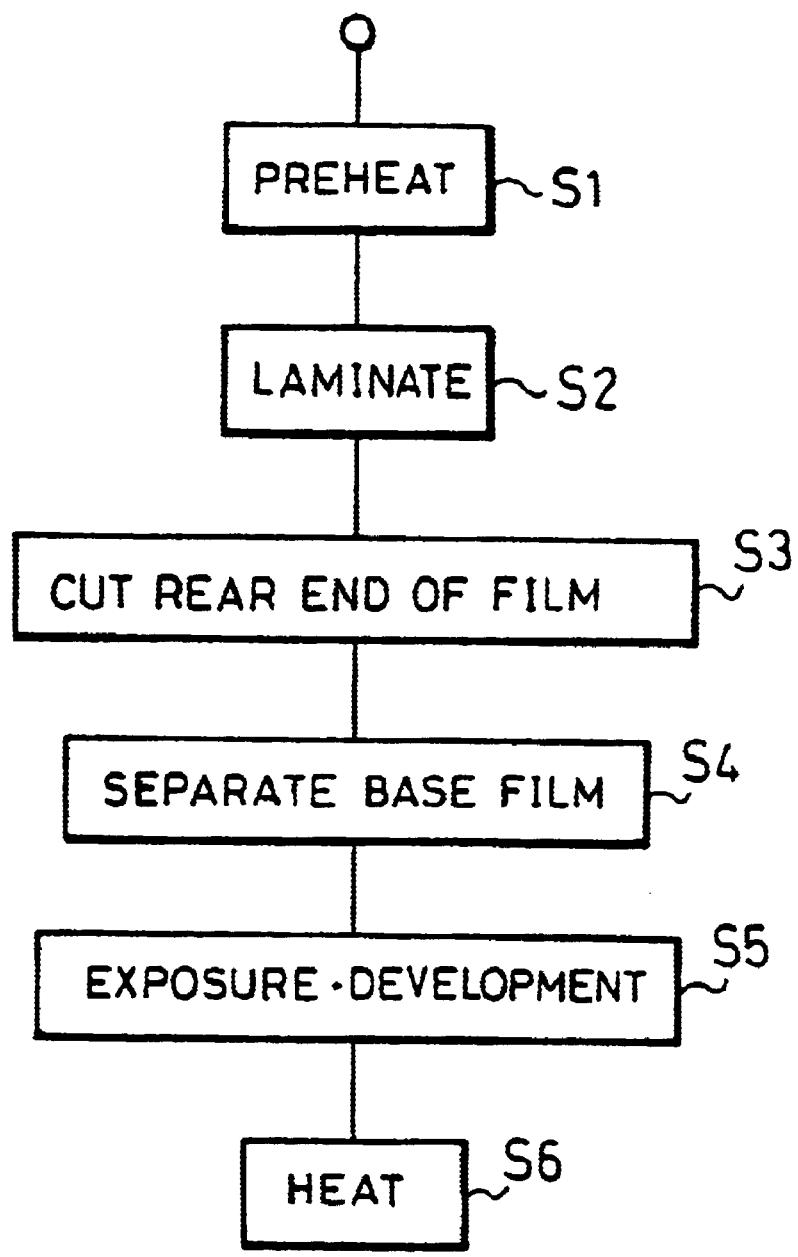

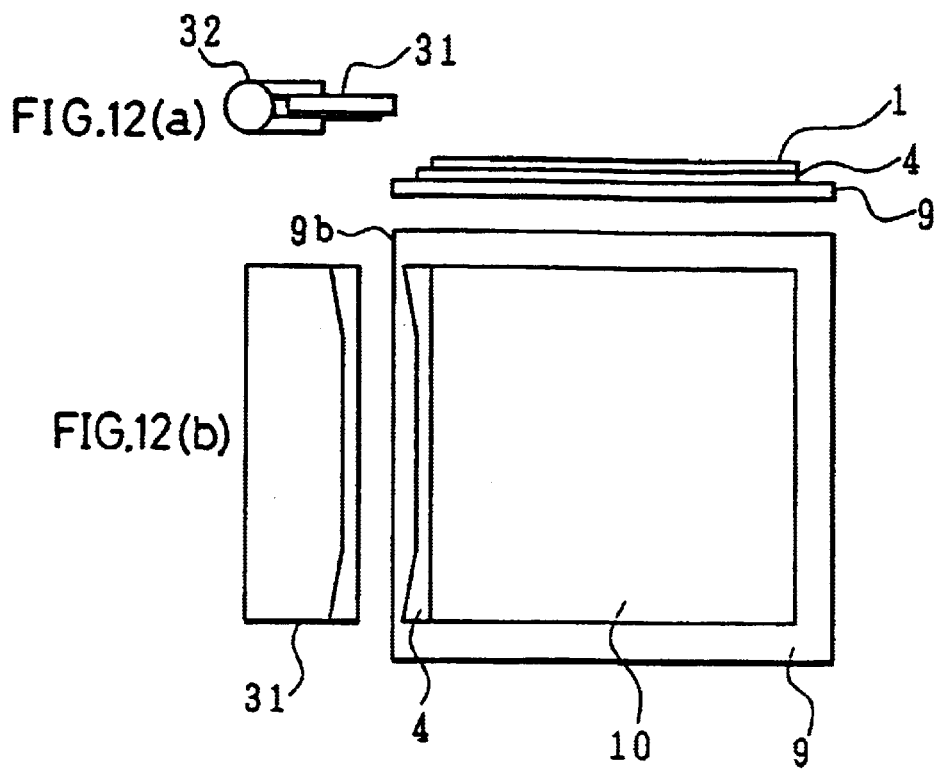
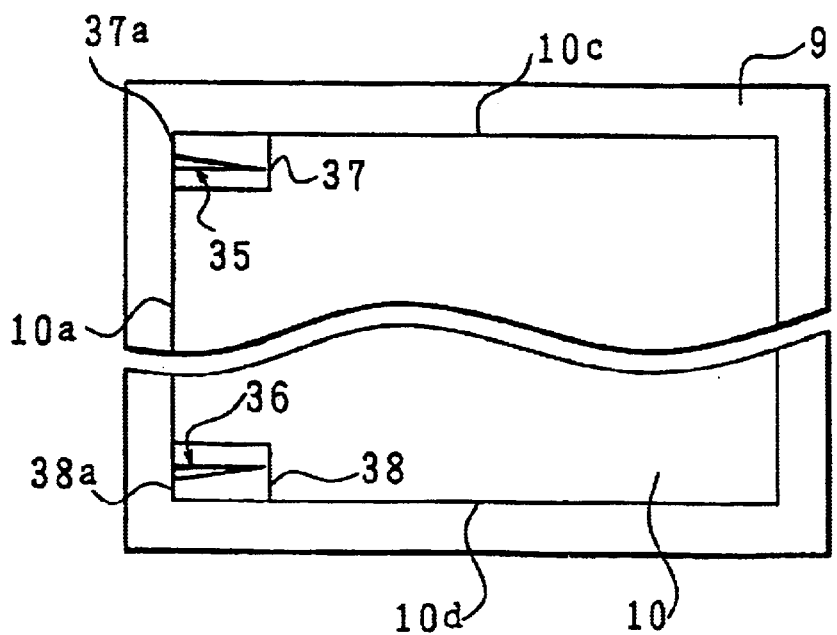

FIG. 21(a) *(Prior Art)* FIG. 21(b) *(Prior Art)* FIG. 21(c) *(Prior Art)*
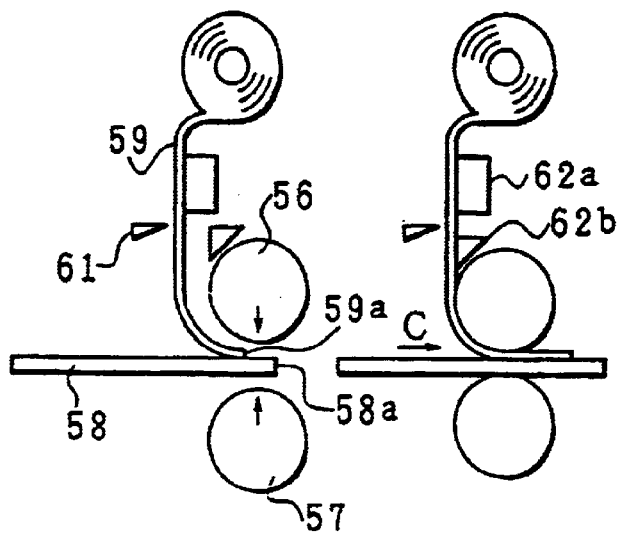
FIG. 21(d) *(Prior Art)*
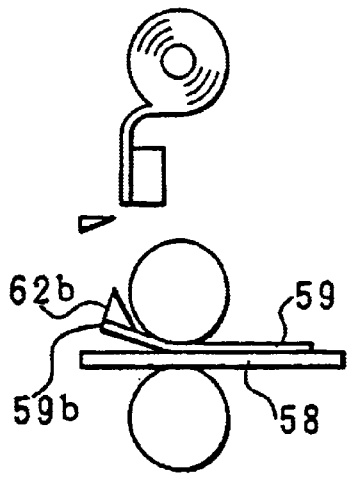
FIG. 21(e) *(Prior Art)*
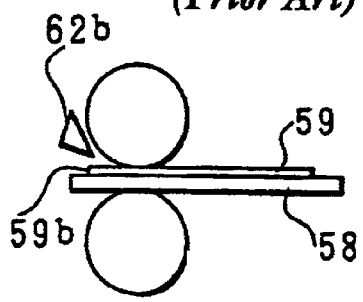

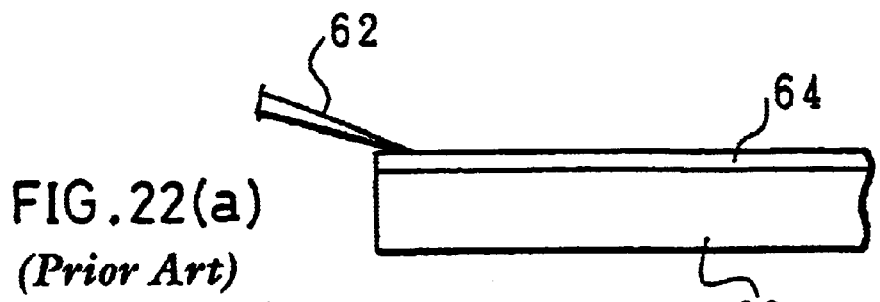
FIG. 22(a) (Prior Art)
FIG. 22(b) (Prior Art)
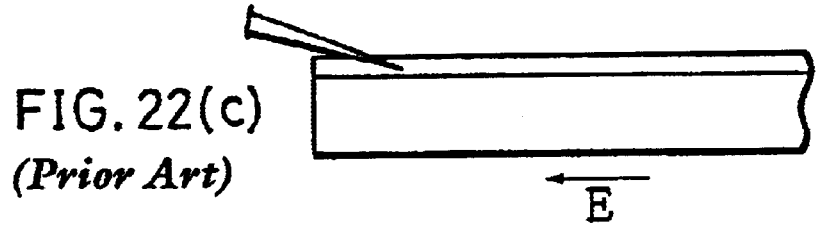
FIG. 22(c) (Prior Art)
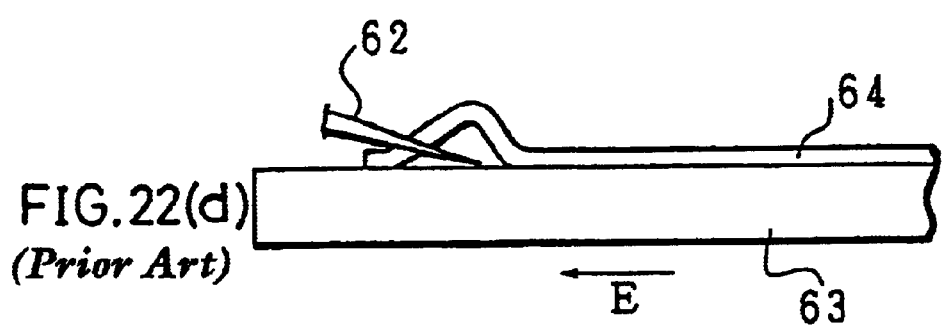
FIG. 22(d) (Prior Art)

FIG.23(a) *(Prior Art)*
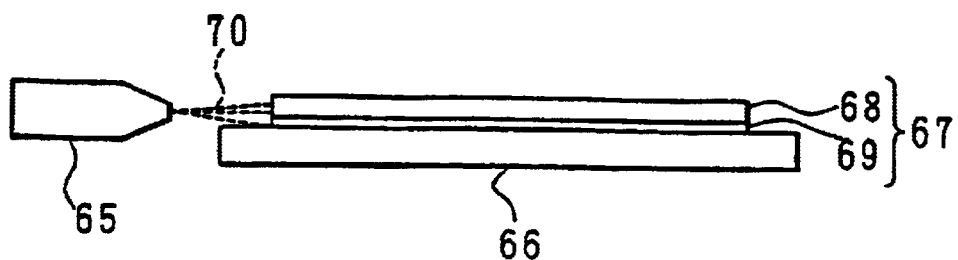
FIG.23(b) *(Prior Art)*
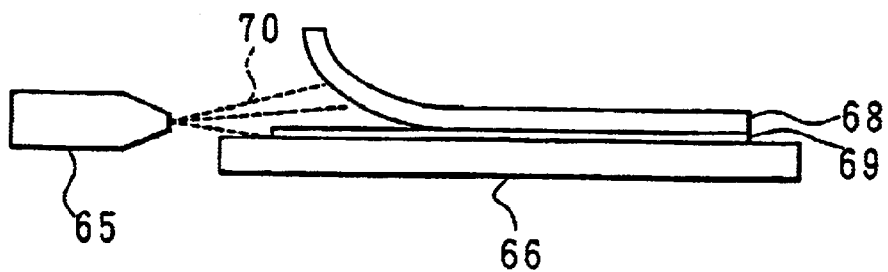

FIG.24 *(Prior Art)*
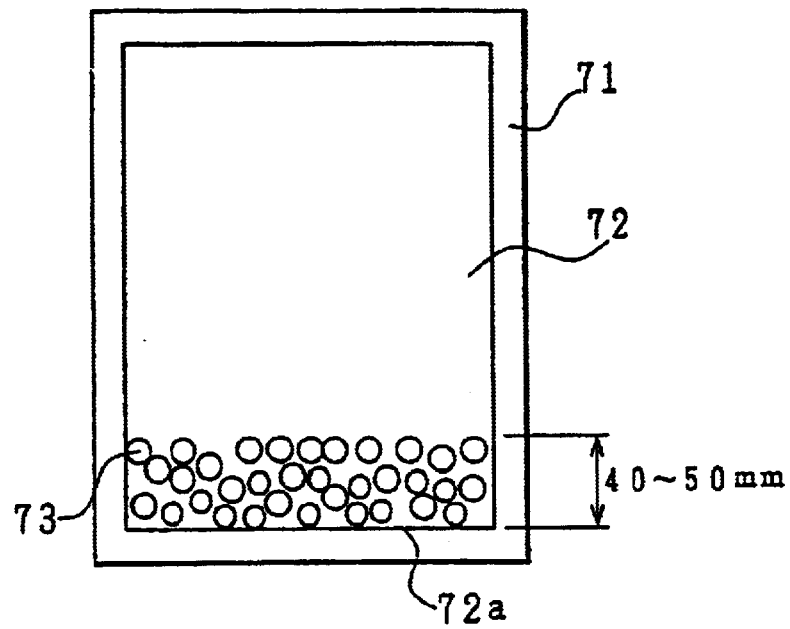
FIG.25(a) *(Prior Art)*
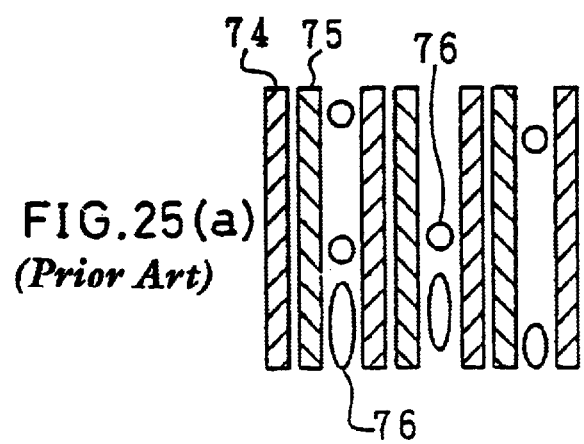
FIG.25(b) *(Prior Art)*
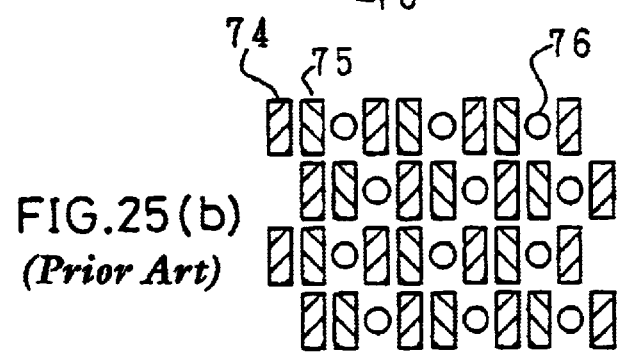

LAMINATION METHOD

This application is a divisional of application Ser. No. 09/153,345, filed Sep. 15, 1998, now U.S. Pat. No. 6,190,489.

FIELD OF THE INVENTION

The present invention relates to a lamination method for laminating resin layers on a substrate, and more specifically concerns a lamination method which is preferably used for laminating a photosensitive resin layer that serves as a material for a color filter onto the substrate. The color filter is utilized particularly in the manufacture of a display panel of a liquid crystal display.

BACKGROUND OF THE INVENTION

Conventionally, there has been known a method in which, upon manufacturing a display panel of a liquid crystal display, a flexible laminated film, referred to as a dry resist film, is thermally bonded (laminated) onto a substrate in order to provide a color filter on a substrate.

The dry resist film has a construction in which a photosensitive resin layer, referred to as a color resist layer, is provided on a belt-shaped support called a base film, and an intermediate layer, such as an oxygen-shielding layer, is normally interpolated between the base film and the color resist layer. The color resist layer, which is a material of a color filter, forms the color filter through exposing, developing and heating processes after the base film has been separated therefrom in the post treatment. In order to form color filters of respective colors, it is required that color resist layers of the respective colors be laminated onto the substrate; that is, for each of three colors of R (red), G (green) and B (blue), or for each of the four colors including black, processes are required in which a dry resist film is laminated onto the substrate, the base film is separated, and the color resist layer is subjected to exposing, developing and other processes so that a color filter having the corresponding color is formed.

In order to laminate the dry resist film onto the substrate, there has been known a method in which the lamination is carried out by using a device referred to as a continuous laminating device. As illustrated in FIG. 19, in the continuous laminating device, dry resist film 54 is thermally bonded continuously onto substrates 53 by a pair of thermal bonding rollers 51 and 52, while the substrates 53 are being transported between the thermal bonding rollers 51 and 52 one after another with given intervals in the direction of arrow A. The dry resist film 54 is wound onto a film take-out core 55 in the shape of a roll, and upon being thermally bonded, is supplied, with the color resist layer of the dry resist film 54 facing down so as to adhere to the substrate 53.

After the thermal bonding process, the dry resist film 54 is cut into pieces in the direction of arrow B between the respective substrates 53. Therefore, each of the substrates 53 is sent to the next process with excessive portions of the dry resist film 54 extruding in the front and rear sides when seen in the substrate-feeding direction A.

In the above-mentioned continuous laminating device, however, if the substrates 53, which are to be transported between the thermal bonding rollers 51 and 52, should be exhausted and the supply thereof should be interrupted, the next process also has to be stopped, causing unnecessary time-consuming tasks to recover the operation; the resulting problems are loss of time and loss of production.

Moreover, in the above-mentioned continuous laminating device, it is necessary to eliminate the extruding excessive portions of the dry resist film 54 for each of the substrates 53; however, it is difficult to eliminate these portions with precision, resulting in another problem.

Therefore, it has become a main trend to use a lamination method in which a device called an intermittent laminating device as illustrated in FIG. 20 is used. In the intermittent laminating device, dry resist film 59 is thermally bonded intermittently onto substrates 58 by a pair of thermal bonding rollers 56 and 57, while the substrates 58 are being transported between the thermal bonding rollers 56 and 57 one after another with given intervals in the direction of arrow C. In other words, when it is laminated onto the substrate 58, the dry resist film 59, which has been wound onto a film take-out core 60 in the shape of a roll, is cut in the direction of arrow D by a cutting means 61 so that each piece has a size shorter than length L of the substrate 58 in the feeding direction.

The following description will discuss the operation of the above-mentioned intermittent laminating device more specifically. First, as illustrated in FIG. 21(a), preparatory processes, such as clamping the leading end 59a of the dry resist film 59 and a predetermined position in the vicinity of the leading end 58a of the substrate 58 by the thermal bonding rollers 56 and 57, are carried out. Next, as illustrated in FIG. 21(b), a laminating process is started from the vicinity of the leading end 58a of the substrate 58 while the substrate 58 is being transported in the direction of arrow C. Upon laminating, the dry resist film 59 is vacuum-supported by vacuum suction units 62a and 62b for the purposes of imparting a certain degree of tension, etc.

Next, as illustrated in FIG. 21(c), in the course of laminating, the dry resist film 59 is cut by the cutting means 61 so as to have a size shorter than length L of the substrate 58 in the feeding direction. Even after having been cut, the dry resist film 59 is vacuum-supported by being sucked by the vacuum suction units 62b at the vicinity of the rear end 59b thereof so that it is free from slackness and wrinkles.

Thereafter, as illustrated in FIG. 21(d) the vicinity of the rear end 59b of the dry resist film 59 is vacuum-supported by the vacuum suction unit 62b until it has reached the limitation immediately before the completion of lamination, and as illustrated in FIG. 21(e), after having been released from the suction process, the rear end 59b is laminated onto the substrate 58, thereby completing the lamination.

Moreover, concerning another prior-art lamination method, Japanese Laid-Open Patent Publication No. 338041/1993 (Tokukaihei 5-338041) discloses a method in which upon press-bonding a laminated film onto a sheet substrate, the laminated film is press-bonded in a manner so as to extrude greatly as compared with the length of the sheet substrate.

Here, in either case of the above-mentioned lamination methods, before and after the laminating process, or during the laminating process, the film-cutting process is required. In the cutting process as described above, a cutter, such as a rotary cutter, or a special blade having a triangular edge, such as disclosed in Japanese Laid-Open Patent Publication No. 23689/1994 (Tokukaihei 6-23689), is used.

Moreover, after the dry resist film has been laminated onto the substrate, it is necessary to separate the base film located on the upper side as described earlier. Concerning such a separating method, for example, Japanese Laid-Open Patent Publication No. 157187/1995 (Tokukaihei 7-157187) discloses a method in which, as illustrated in FIG. 22, a protective film 64, laminated onto a substrate 63, is separated therefrom by using a separation needle 62. In this method, from a state in which the separation needle 62 comes into contact with the surface of the protective film 64, the separation needle 62 is lowered and pressed onto the protective film 64 as illustrated in FIG. 22(b), and in this state, the substrate 63 is moved in the direction of arrow E as illustrated in FIG. 22(c). Thus, the separation needle is allowed to stick in the protective film 64. Further, the protective film 64 on the substrate 63 is gradually separated from its end portion by moving the substrate 63 in the direction of arrow E as illustrated in FIG. 22(d).

Concerning another separating method, a method using an air knife 65 for separation as illustrated in FIG. 23 has been known. As illustrated in FIG. 23(a), in this method, an air knife 65 blows air 70 between a base film 68 and a color resist layer 69 on a dry resist film 67 that has been laminated onto a substrate 66. Thus, as illustrated in FIG. 23(b), the base film 68 is separated from the interface of the color resist layer 69.

However, the lamination method using the above-mentioned intermittent laminating device raises the following problems.

For example, in the case when the color filters of three colors, red, blue and green, are successively formed on a glass substrate used for a liquid crystal display, etc. through the lamination method using the above-mentioned intermittent laminating device, upon formation of the first color filter, bubbles 73 are entrapped between the color resist layer and the substrate 71 in a range located approximately 40 mm to 50 mm from the rear edge 72a of the dry resist film 72 on the substrate 71 as illustrated in FIG. 24.

Further, upon formation of the second or third color filter, bubbles 73 are also entrapped between the color resist layer and the substrate 71 in a range located approximately 40 mm to 50 mm from the rear edge 72a of the dry resist film 72 in the same manner as the first color filter. Therefore, as illustrated in FIG. 25, after formation of the color filter layers 74 and 75, bubbles 76 are entrapped between the color filter layers 74 and 75 as shown in FIG. 25(a) in the stripe arrangement, or as shown in FIG. 25(b) in the delta arrangement.

The reason for the generation of bubbles is explained as follows: Upon laminating the dry resist film on the substrate, as illustrated in FIG. 21(e), the vacuum support of a dry resist film 59 by the vacuum suction units 62b becomes impossible immediately before the completion of lamination, and the suction process is terminated. Consequently, a portion of the dry resist film 59, located in the region of 40 mm to 50 mm from the rear end 59b of the dry resist film 59, drops on the substrate 58 as it is, and is laminated in the state as dropped. Therefore, since no escape path for air is maintained in this portion, bubbles are entrapped therein.

Minute losses of the color resist layers measuring approximately 20 μm to 30 μm occur due to the generation of the bubble, resulting in problems such as color loss in the color filters. Consequently, it becomes difficult to expand the display section to the proximity of the edge of the substrate. Further, another problem is that fine contaminants, derived from the resin material, adhere to inappropriate portions.

Moreover, in the lamination method using the intermittent laminating device, upon thermal bonding, a minute amount of the color resist layer extrudes from the base film at the edge of the dry resist film; this adheres to the thermal bonding rollers, etc., causing disturbance in the uniformity of the applied pressure of the rollers, or the resin film adheres to the upper side of the base film, causing problems such as degradation in separation of the base film and the linearity precision of the edge of the color resist layer.

Furthermore, in the case when the dry resist film on the substrate is cut with a cutter, etc., after the laminating process, if the substrate is a hard substrate such as a glass substrate or a ceramic substrate, the cutter, etc., fails to cut the films repeatedly with high linearity precision, and either the substrate or the blade tends to be cracked, resulting in contaminants. These cause defects in precision devices such as liquid crystal displays.

Concerning the conventional method in which the base film is separated after the laminating process, in the case of the method disclosed by Japanese Laid-Open Patent Publication No. 157187/1995 (Tokukaihei No. 7-157187), upon sticking the protective film 64 with the separation needle 62, the separation needle 64 tends to fail to stick in the protective film 64 sufficiently, causing a problem of drop of the protective film 64. This is due to the fact that the surface of the protective film 64 is very slippery and after continuous use of the separation needle 62, the point of the separation needle 62 wears out and gradually loses its sharpness due to loads applied thereto.

Moreover, upon sticking the protective film 64 with the separation needle 62, dusts, such as film chips, are generated from the protective film 64, and adhere to the surface of the substrate 63, etc., thereby causing contamination in the manufacturing processes.

In the method in which the separation is made by using the air knife 65, upon separating, a considerable amount of air 70 is blown thereon, resulting in a problem in which defects in the products increase due to ambient contaminants involved therein.

SUMMARY OF THE INVENTION

The objective of the present invention is to provide a lamination method for laminating a resin layer such as a color resist layer on a substrate with high yield.

In order to achieve the above-mentioned objective, a lamination method of the present invention, which is a method in which a film, formed by providing a resin layer on a belt-shaped support, is cut based upon the length of a substrate in the feeding direction, and press-bonded onto the substrate, and then the resin layer is transferred onto the substrate by separating the belt-shaped support, is provided with the steps of: in the cutting process, cutting the film so that the rear end of the film, after the press-bonding, extrudes from the rear end of the substrate by a predetermined width; and cutting the film again at a position inside the rear end of the substrate prior to separating the belt-shaped support after the film has been press-bonded so as to eliminate the portion of the film extruding from the substrate.

This method makes it possible to prevent bubbles from being entrapped onto the interface between the substrate and the resin layer; therefore, it is possible to reduce the number of defective products, and also to expand the display section to the vicinity of the edge of the substrate. Moreover, since this method reduces the possibility of the resin layer extruding even at the cut section on the substrate, the belt-shaped support can be separated easily from the resin layer along the interface, making it possible to laminate the resin layer on the substrate with high linearity precision.

Moreover, in order to achieve the above-mentioned objective, another lamination method of the present invention, which is a lamination method including a process in which, after a film, formed by providing a resin layer on a belt-shaped support, has been press-bonded onto a hard substrate, one portion of the film on the substrate is cut, is provided with the step of using a shaving-use blade made of stainless steel in the cutting process.

With this method, upon cutting the film on the substrate, it is possible to reduce the occurrence of scattering and unevenness of resin, and consequently to allow cutting with superior linearity precision and easy separation. Further, even in the case of a hard substrate, both the substrate and the blade become less susceptible to cracks; therefore, since the blade can be used repeatedly while maintaining a superior cutting property, high production efficiency is ensured.

In order to achieve the above-mentioned objective, still another lamination method of the present invention, which is a lamination method in which, after a film, formed by providing a resin layer on a belt-shaped support, has been cut based upon the length of a substrate in the feeding direction, and press-bonded onto the substrate, the resin layer is transferred onto the substrate by separating the belt-shaped support, is provided with the steps of: in the separating process, making at least one cut from one end of the film and separating the belt-shaped support by making the belt-shaped support and the resin layer apart from each other at the vicinity of the cut.

In this method, a minute rise is formed between the belt-shaped support and the resin layer by making the cut in the belt-shaped support so that a load applied upon starting the separation of the belt-shaped support is dispersed and lessened, thereby allowing easy separation. Moreover, since the separation is gradually extended from the cut area, it is carried out easily without difficulty.

For a fuller understanding of the nature and advantages of the invention, reference should be made to the ensuing detailed description taken in conjunction with the accompanying drawings.

BRIEF DESCRIPTION OF THE DRAWINGS

FIG. 2 is a flow chart showing respective processes of the lamination method.

FIGS. 12(a) and 12(b) are drawings that show a state in which the extruding portion of the dry resist film has been properly eliminated.

FIG. 13 is a plan view that shows a state in which cuts are formed in the dry resist film prior to a separating process.

FIGS. 21(a), 21(b), 21(c), 21(d) and 21(e) are explanatory drawings that show the operation of the conventional intermittent laminating device.

FIGS. 22(a), 22(b), 22(c) and 22(d) are explanatory drawings that show conventional separating processes in which a separation-use needle is used.

FIGS. 23(a) and 23(b) are explanatory drawings that show conventional separating processes in which an air knife is used.

FIG. 24 is a plan view that shows the generation of bubbles in the vicinity of the rear end of the film in the case of lamination using a conventional lamination method.

FIGS. 25(a) and 25(b) is enlarged drawings that show the generation of bubbles in the vicinity of the rear end of the film in the case of lamination using the conventional lamination method.

DESCRIPTION OF THE EMBODIMENTS

Referring to FIGS. 1 through 18, the following description will discuss one embodiment of the present invention.

The lamination method of the present embodiment is a method in which, upon manufacturing a display panel of a liquid crystal display, a photosensitive resin layer, which is a material of a color filter layer, is transferred and laminated on a substrate in order to form the color filter layer on the substrate.

In the present lamination method, as illustrated in FIG. 2, in order to provide color filter layers of respective colors on a substrate, after preheating the substrate (S1), a dry resist film is thermally bonded (laminated) to the substrate (S2). Next, the rear edge of the dry resist film is cut (S3), and after the base film has been separated (S4), the color resist layer is exposed, developed (S5), and heated in an oven, etc. (S6) so that the color filter layer is formed on the substrate as a pattern.

It is necessary to perform these processes (S1 through S6) for each of the color filters of respective colors; in other words, in the case of the formation of color filters having three colors of R (red), G (green) and B (blue) on the substrate, the above-mentioned processes (S1 through S6) have to be repeated three times, and in the case of the formation of color filters having four colors of R, G, B plus black, the above-mentioned processes (S1 through S6) have to be repeated four times.

With respect to the above-mentioned substrate, a glass substrate, a ceramic substrate, a printed substrate or a resin substrate may be used.

The dry resist film, which is a flexible laminated film, has a construction in which a photosensitive resin referred to as a color resist layer is formed on a belt-shaped support referred to as a base film.

Figure 3:
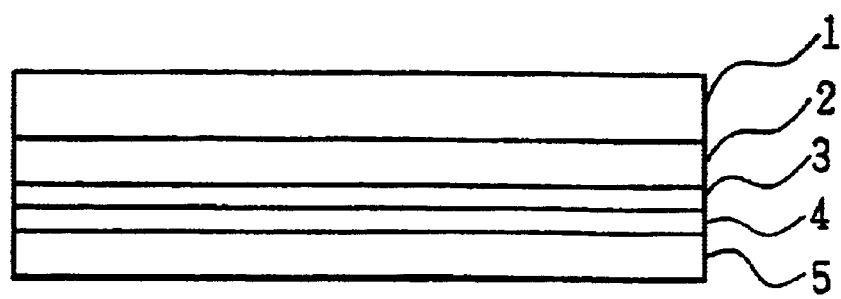
FIG. 3 is a drawing that shows the construction of a dry resist film that is laminated on a substrate in the lamination method.

Various types of films may be used as the dry resist film; and in the present lamination method, a dry resist film as shown in FIG. 3 is used. This dry resist film, which has a width in the range of 400 mm to 650 mm, is constituted by a base film 1, a cushion layer 2, an oxygen-shielding layer 3, a color resist layer 4 and a separate film (cover film) 5 that have been stacked.

The separate film 5 is used to prevent the color resist layer 4 from sticking to the base film 1 upon taking up the film, so as to protect it until it has been laminated onto the substrate; therefore, this film is removed immediately before laminating.

The color resist layer 4 is a photosensitive resin layer used for forming a color filter layer having each color, and is sometimes used to form a black matrix. The color resist layer 4, after having been transferred and laminated onto the entire surface of the substrate, is formed into a pattern through exposing and developing processes.

The oxygen-shielding layer 3 is a layer for blocking oxygen in the air since oxygen has adverse effects on resist cure during the exposing process. The oxygen-shielding layer 3 is entirely removed in the developing process.

The cushion layer 2 is made of a material that drastically softens upon application of heat. The cushion layer 2 is a buffering layer that functions so that upon laminating, the pressure is uniformly dispersed so as to allow the color resist layer 4 to follow the pattern of protrusions and recesses formed on the substrate without generating bubbles. The cushion layer 2 is entirely removed together with the oxygen-shielding layer 3 by the developing process.

The base film 1 functions as a support in manufacturing the dry resist films. Upon completion of laminating, the base film 1 is removed in a separating process which will be described later, before the processes such as exposure and development are carried out.

The following description will discuss the laminating process in the present lamination method.

FIG. 1 is an explanatory drawing that shows the laminating process in which a laminating device 6 is used. This laminating device 6, which is an intermittent laminating device, has a construction in which dry resist film 10 is thermally bonded intermittently onto substrates 9 by a pair of thermal bonding rollers 7 and 8, while the substrates 9 are being transported between the thermal bonding rollers 7 and 8 one after another with given intervals in the direction of arrow F.

Moreover, in this laminating device 6, when it is laminated onto the substrate 9, the dry resist film 10, which has been wound onto a film take-out core 11 in the shape of a roll, is cut by a cutting means 12 based upon the length L of the substrate 9 in the feeding direction; more specifically, the cutting process is carried out so as to allow the rear end 10b of the dry resist film 10 after the thermal bonding to extrude from the rear end 9b of the substrate 9 with a predetermined width. Here, as will be described later, the predetermined width is preferably set in the range of 30 mm to 60 mm; and in the present lamination method, the cutting process is performed so that the rear end 10b of the dry resist film 10 is allowed to extrude by 40 mm to 50 mm from the rear end 9b of the substrate 9.

Figure 1A:
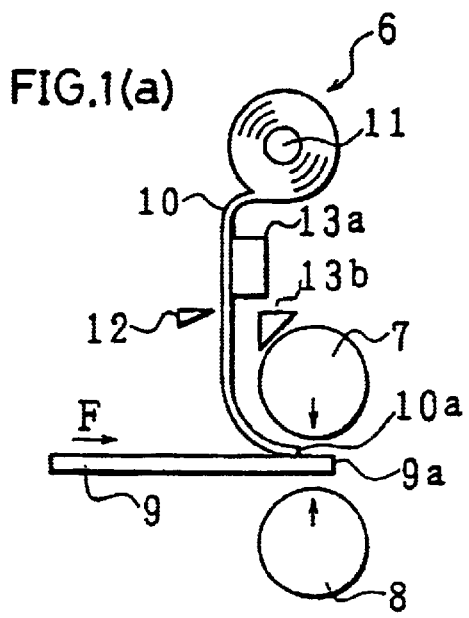
FIGS. 1(a), 1(b), 1(c) and 1(d) are explanatory drawings that show the operation of a laminating device used in the lamination method concerning one embodiment of the present invention.
Figure 1B:
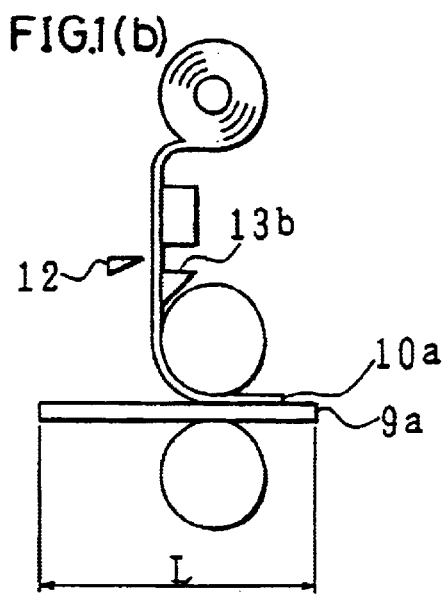

The following description will discuss the operation of the above-mentioned laminating device 6 more specifically. First, as illustrated in FIG. 1(a), preparatory processes, such as clamping the leading end 10a of the dry resist film 10 and a predetermined position in the vicinity of the leading end 9a of the preheated substrate 9 by the thermal bonding rollers 7 and 8, are carried out. Next, as illustrated in FIG. 1(b), a laminating process is started from the vicinity of the leading end 9a of the substrate 9 while the substrate 9 is being transported in the direction of arrow F. Upon laminating, the dry resist film 10 is vacuum-supported by vacuum suction units 13a and 13b for the purposes of imparting a certain degree of tension, etc.

Figure 1C:
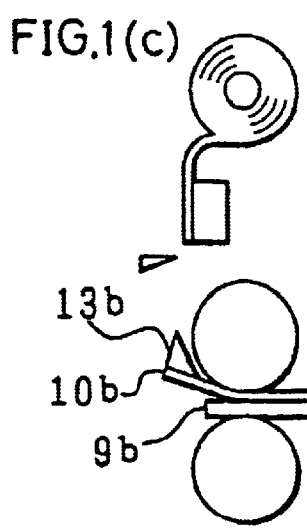

Next, as illustrated in FIG. 1(c), in the course of laminating, the dry resist film 10 is cut by the cutting means 12 so as to allow the rear end 10b of the dry resist film 10 after the thermal bonding to extrude by 30 mm to 60 mm from the rear end 9b of the substrate 9. This range of the length of the extruding portion of the film 10 is determined by the results of research made on the correlations among the length of the extruding portion of the film 10, the generation of bubbles in the vicinity of the rear end of the substrate 9b and contamination of the thermal bonding rollers 7 and 8 as shown in Table 1. Even after having been cut, the dry resist film 10 is vacuum-supported by being sucked by the vacuum suction unit 13b at the vicinity of the rear end lob thereof so that it is free from slack and wrinkles.

TABLE 1

| | Length of Extruding Portion of Film [mm] | | | | | | | | | |
|---|---|---|---|---|---|---|---|---|---|---|
| | 0 | 10 | 20 | 30 | 40 | 50 | 60 | 70 | 80 | 90⁻ |
| Generation of Bubbles at Substrate End | x | x | x | o | ⊚ | ⊚ | ⊚ | ⊚ | ⊚ | ⊚ |
| Contamination of Thermal Rollers | ⊚ | o | o | o | o | o | o | x | x | x |

In Table 1, in the row for evaluation of "the generation of bubbles in the vicinity of the rear end of the substrate", x represents the fact that, when the area inside the position 5 mm apart from the rear end 9b of the substrate is defined as an effective area for pattern, bubbles are entrapped within the effective area for pattern in the vicinity of the rear end 9b of the substrate, o represents the fact that bubbles are hardly entrapped within the effective area for pattern, raising no problem for practical use, and ⊚ represents the fact that no bubbles are entrapped up to the rear end 9b of the substrate, resulting in superior quality. In the row for evaluation of "contamination of the thermal bonding rollers", x represents the fact that the probability of contamination of the thermal bonding rollers 7 and 8 is high due to the extruding portion of the color resist layer 4 contacting the thermal bonding rollers 7 and 8, o represents the fact that the probability of contamination of the thermal bonding rollers 7 and 8 is low, and ⊚ represents the fact that there is no probability of contamination of the thermal bonding rollers 7 and 8 since no portion of the film 10 extrudes from the substrate 9.

By cutting the dry resist film 10 so as to allow the rear end 10b of the dry resist film 10 after the thermal bonding to extrude by 30 mm to 60 mm from the rear end 9b of the substrate 9, it is possible to vacuum-support the dry resist film 10 until the laminating process onto the substrate 9 has been completed; that is, as illustrated in FIG. 1(c), it is possible to vacuum-support the dry resist film 10 until it is firmly laminated onto the rear end 9b of the substrate 9.

Figure 1D:
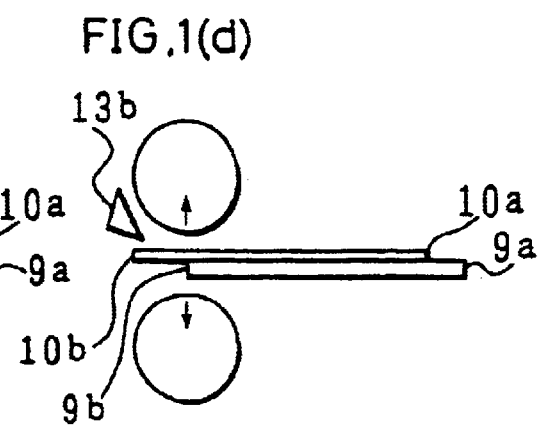

As illustrated in FIG. 1(d), upon laminating up to the rear end 9b of the substrate 9, simultaneously as the thermal bonding rollers 7 and 8 are unclamped, the vacuum support by the vacuum suction unit 13b is released. Thus, the dry resist film 10 is allowed to drop; however, at this time the laminating process has already been completed.

Figure 4:
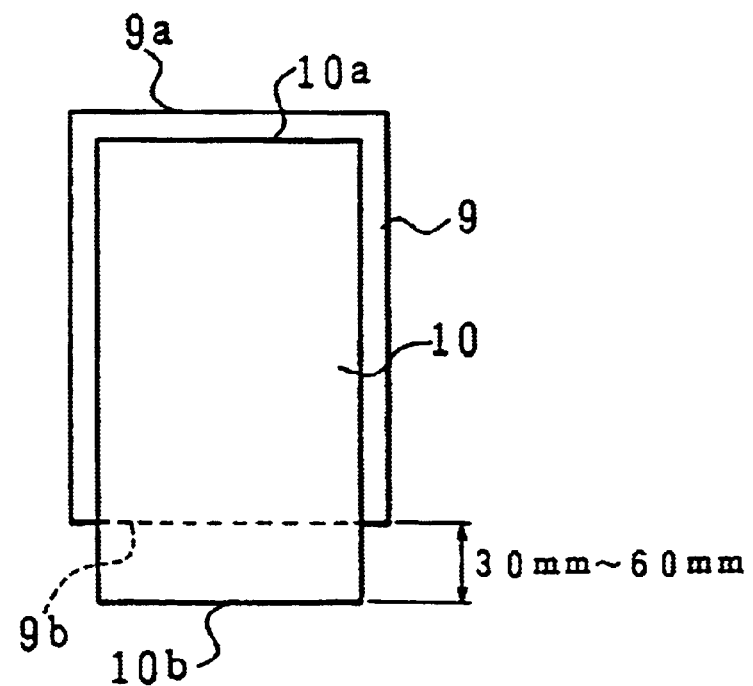
FIG. 4 is a plan view that shows a state in which the dry resist film is laminated with one portion thereof extruding from the substrate.

Therefore, as illustrated in FIG. 4, by allowing the rear end 10b of the dry resist film 10 to extrude by 30 mm to 60 mm, more preferably by 40 mm to 50 mm, from the rear end 9b of the substrate 9 in a manner like a tail, it becomes possible to take the area that is located 30 mm to 60 mm from the rear end and that has been conventionally subjected to the generation of bubbles away from the substrate. Consequently, it is possible to prevent the generation of bubbles particularly entrapped in the vicinity of the end of the film, and also to prevent serious defects in quality in color filters formed by the film thermal transferring system.

In the above-mentioned laminating process, the bonding speed was set at approximately 1 m/minute, and at the time of laminating, the temperature of the substrate was set at not less than 100±10° C. and the temperature in the vicinity of the thermal bonding rollers 7 and 8 was set at approximately 130±5° C.

Moreover, with respect to the area extruding like a tail, the length was preferably set at 30 mm to 60 mm, and more preferably, at 40 mm to 50 mm; however, the length of the extruding area should be defined by taking into consideration the length of the suction face of the vacuum suction unit 13b. In other words, if the suction face of the vacuum suction unit 13b is comparatively short, it is more likely that the length of the extruding area has to be set shorter. In contrast, if the suction face of the vacuum suction unit 13b is comparatively long, the length of the extruding area may have to be longer.

Next, an explanation will be given of the process for cutting and eliminating the area extruding like a tail by using a cutting device. Here, the cutting and removing processes are preferably carried out with a lapse of approximately 1 to 10 minutes, more preferably, approximately 7 minutes after the laminating process. This is to avoid abrupt cooling of the substrate. In other words, as illustrated in Table 2, the cooling time relates to the stability of separation of the base film 1 and the through put and device construction, and by providing the cooling time of 1 to 10 minutes, it is possible to ensure the stability of separation of the base film 1, and also to prevent degradation in the productivity.

TABLE 2

| | Cooling Time [min] (Cooling Substrate Temperature to 23 to 35° C.) | | | | | | | |
|---|---|---|---|---|---|---|---|---|
| | 0.25 | 0.5 | 1 | 2 | 5 | 7 | 10 | 15 |
| Stability of Base-Film Separation | x | x | ○ | ○ | ◎ | ◎ | ◎ | ◎ |
| Through Put & Device Construction | ◎ | ◎ | ◎ | ○ | ○ | ○ | ○ | x |

In Table 2, in the row for evaluation of "the stability of base-film separation", x represents the fact that, upon separating the base film 1, the intermediate layers such as the oxygen-shielding layer 3 are separated together with the base film 1, ○ represents the fact that although only the base film 1 is separated, no margin is provided for variations in the lamination conditions and film property and ◎ represents the fact that only the base film 1 is separated with a sufficient margin for variations in the lamination conditions and film property.

In the row for evaluation of "through put and device construction" in Table 2, x represents failure in practical use since a long stand-by time is required until the next process, in the case when the through put and device construction are taken into account, ○ represents the fact that both the through put and device construction are suitable for practical use, and ◎ represents the fact that both the through put and device construction are suitable for practical use with high efficiency.

Figure 5:
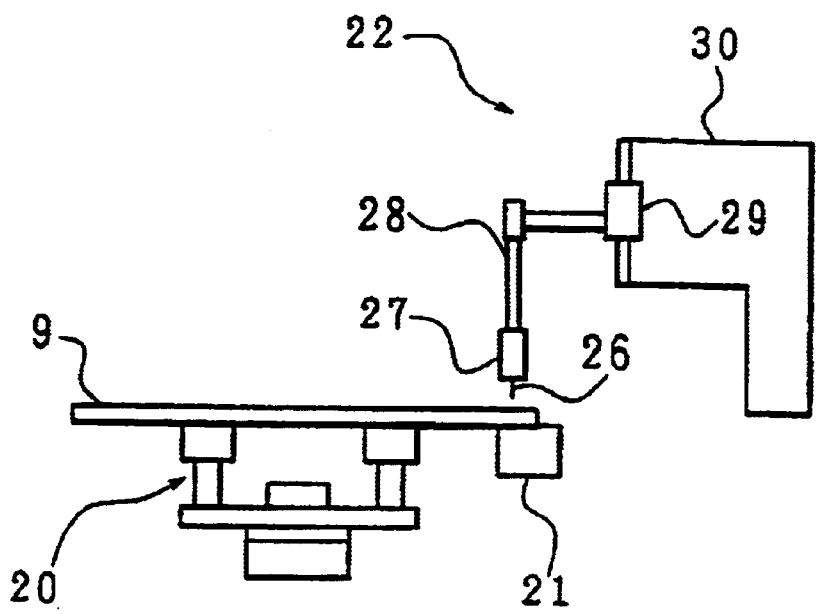
FIG. 5 is a drawing that shows the construction of a cutting device used in the lamination method.

As illustrated in FIG. 5, the cutting device is provided with a support stage 20 on which the substrate 9 is placed, a receiving base 21, a cutting unit 22, etc.

Figure 6:
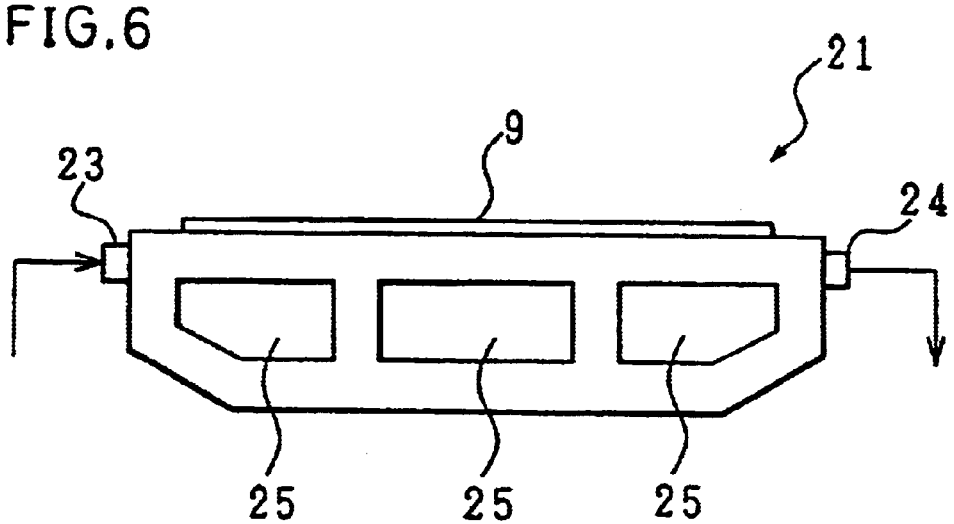
FIG. 6 is a drawing that shows a receiving base for the cutting device.

The support stage 20 is installed so as to be freely pivotable. As illustrated in FIG. 6, the receiving base 21 has an inlet 23 for accepting cooling water, an outlet 24 for discharging cooling water, hollow aluminum tubes 25 for circulating the cooling water, etc.; thus, it is designed to cool a cutting section of the substrate 9 prior to the cutting operation as well as during the cutting operation.

As illustrated in FIG. 5, the cutting unit 22 is provided with a blade 26 for cutting the cutting section of the substrate 9, a supporting means 27 for supporting the blade 26, an arm 28, a raising and lowering means 29 for shifting the blade 26 upward and downward, and a sliding means 30 for shifting the blade 26 in horizontal directions.

Figure 7B:
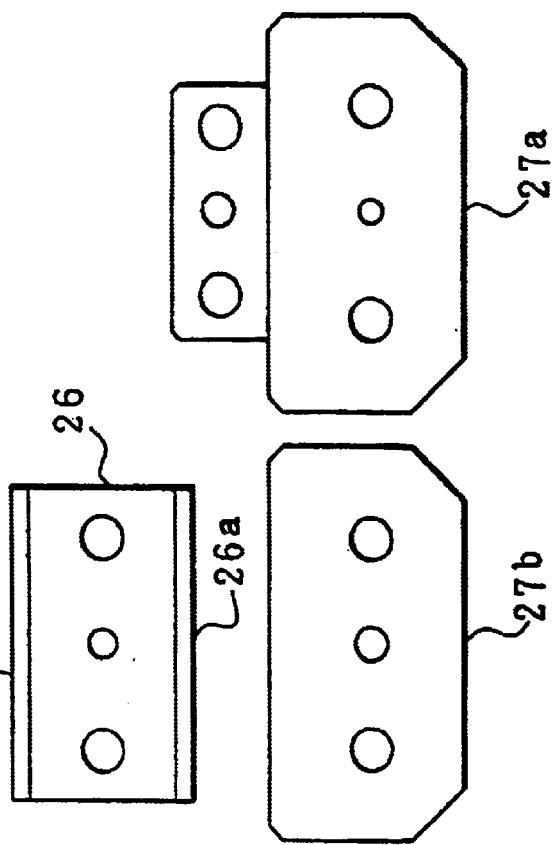
FIGS. 7(a), 7(b) and 7(c) are drawings that show a blade that is used in the cutting device.
Figure 7A:
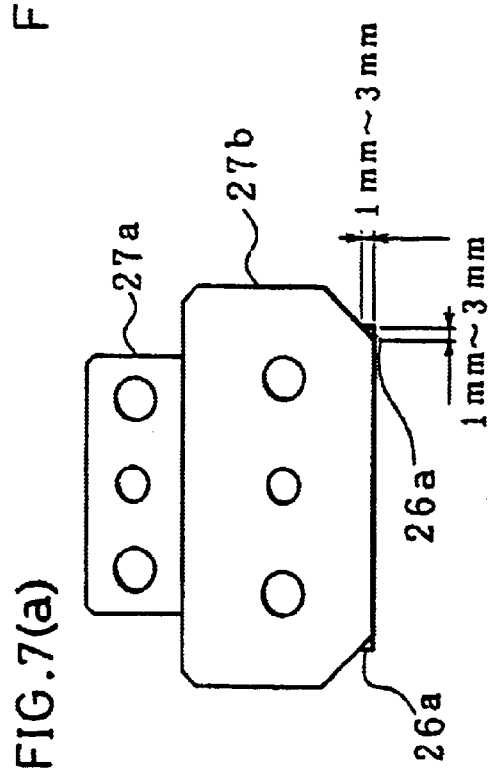

With respect to the blade 26, in order to prevent the generation of film cutting dusts without causing damages to the substrate 9, a double-sided razor with a thin blade width, made of stainless steel, is used as illustrated in FIG. 7(a); however, a single-sided blade may be adopted. By also taking into consideration factors, such as durability, hardness and smoothness of the blade top, the above-mentioned device utilizes the double-sided razor of stainless steel.

Figure 7C:
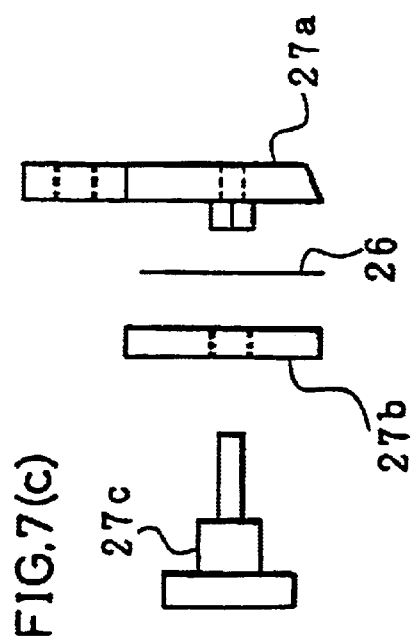

As illustrated in FIG. 7, the supporting mean 27 for supporting the blade 26 is constituted by a receiving jig 27a, a pinching jig 27b and a fixing jig 27c; thus, the blade 26 is sandwiched by the receiving jig 27a and the pinching jig 27b with the right and left sides of the blade top 26a of the blade 26 sticking out by 1 to 3 mm so as to impart firmness to the blade 26. Here, the receiving jig 27a is secured to the arm 28.

Figure 8:
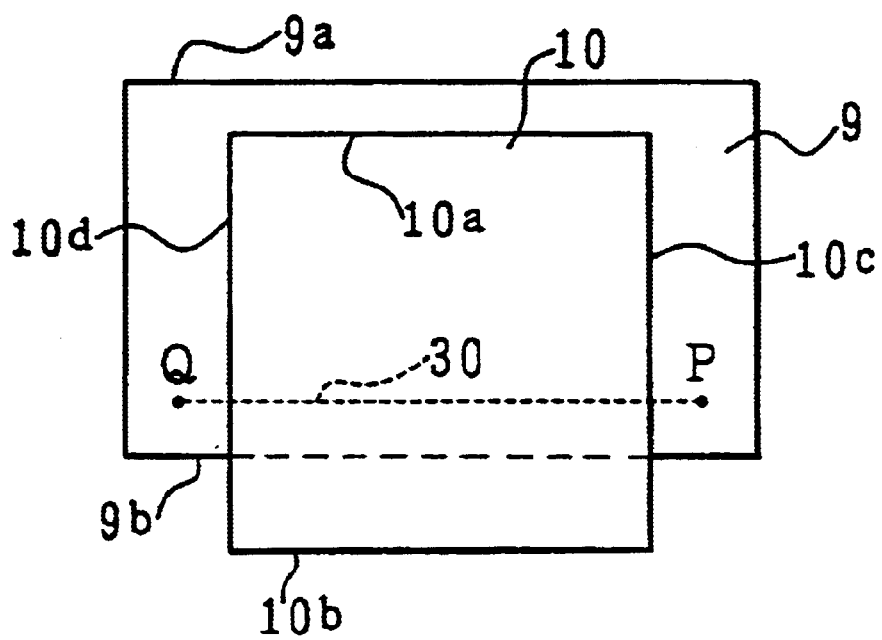
FIG. 8 is a plan view showing a cutting position.

FIG. 8 is a drawing that shows a cutting position of the dry resist film 10 on the substrate 9. As illustrated in FIG. 8, in the present cutting operation, the cutting section 30 of the dry resist film 10 is positioned inside the rear end 9b of the substrate 9 by not less than 3 mm. This arrangement is made because the adhesion between the dry resist film 10 and the substrate 9 might be weak at positions closer to the substrate rear end 9b than the above-mentioned position.

Moreover, point P at which the blade 26 is lowered onto the substrate 9 to start cutting is set at a position apart from one end 10c of the dry resist film 10 by not less than 1 mm, and point Q at which the cutting is finished is set at a position apart from the other end 10d of the dry resist film 10 by not less than 1 mm. This arrangement is made so as to ensure positive, complete cutting. In this case, however, caution should be taken so as not to let the blade 26 drop from the substrate 9.

Figure 9:
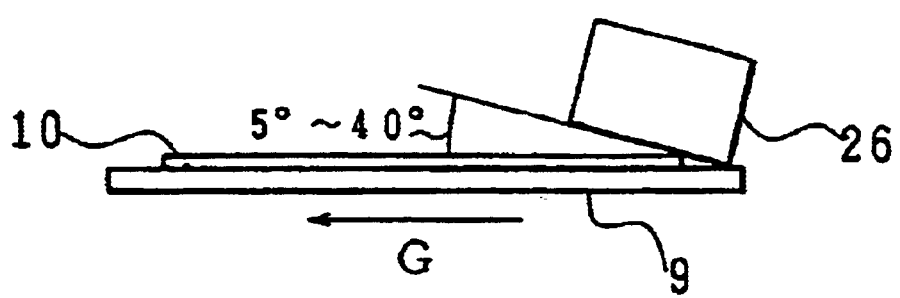
FIG. 9 is an explanatory drawing that shows a specific angle of the blade that is taken during the cutting process.
Figure 10:
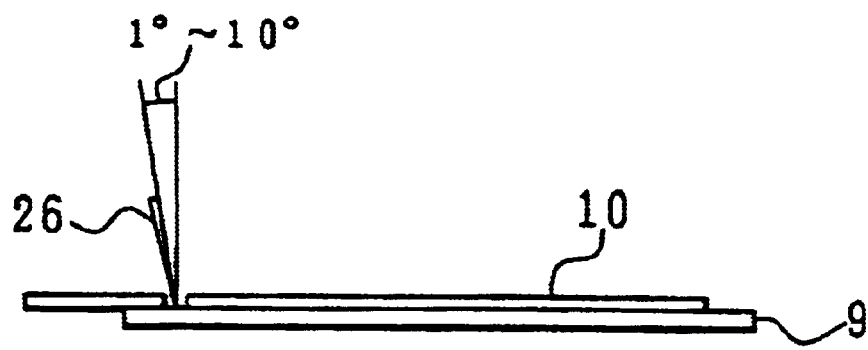
FIG. 10 is an explanatory drawing that shows a specific angle of the blade that is taken during the cutting process.

FIGS. 9 and 10 are explanatory drawings that show a specific angle of the blade 26 that is made during the cutting operation. As shown in Table 3, research was carried out on the correlations among the angle made by the blade top 26a and the surface of the substrate 9, the generation of cutting dusts of the base film 1, and the service life of the blade 26 depending on wear of the blade top 26a, and the results show that as shown in FIG. 9 a desired cutting operation is obtained when the blade 26 is inclined so as to set the angle made by the blade top 26a and the surface of the substrate 9 in the range of 5° to 40°, more preferably in the range of 10° to 30°, thereby cutting in the direction of arrow G. Moreover, as illustrated in FIG. 10, the blade 26 is inclined toward the substrate rear-end 9b side by 1° to 10°, and more preferably by 3° to 7°, from the line perpendicular to the surface of the substrate 9, so as to carry out a desired cutting operation.

TABLE 3

| | Angle of Blade Top and Substrate Surface [°] | | | | | | |
|---|---|---|---|---|---|---|---|
| | 0 | 5 | 10 | 20 | 30 | 40 | 50 | 60⁻ |
| Generation of Cutting Dusts of Base Film | x | ○ | ⊙ | ⊙ | ⊙ | ⊙ | ⊙ | ⊙ |
| Service Life of Blade depending on Wear | ⊙ | ⊙ | ⊙ | ⊙ | ⊙ | ○ | x | x |

In Table 3, in the row for evaluation of "the generation of cutting dusts of the base film", x represents the fact that no cutting operation for the film 10 is available, ○ represents the fact that although the cutting operation for the film 10 is available, cutting dusts tend to be generated, and ⊙ represents the fact that the cutting operation for the film 10 is desirably carried out without generation of cutting dusts.

In the row for evaluation of "the service life of the blade depending on wear of the blade top" that was made with respect to cutting operations of 100 times, x represents the fact that the cutting operation becomes unoperative in less than 100 times, raising a problem of the service life of the blade 26, ○ represents the fact that although the cutting operation is operative up to 100 times, the tendency of generation of cutting dusts of the base film 1 increases as the number of the operations increases, and ⊙ represents the fact that the cutting operation is desirably carried out even after not less than 100 times of cutting operations.

The reason that upon cutting, the blade 26 is inclined so as to set the angle made by its blade top 26a and the surface of the substrate 9 in the range of 5° to 40° is because in the construction of the blade 26, the above-mentioned range of angles of inclination is considered to be the most suitable range for shifting the blade 26 while maintaining a point contact between the blade 26 and the substrate 9.

Moreover, the reason that upon cutting, the blade 26 is inclined toward the substrate rear-end 9b side by 1° to 10° from the line perpendicular to the surface of the substrate 9 as described above is because, as shown in Table 4, a lifted state of the base film 1 with respect to the color resist layer 4 is preferable and also because, as the results of review on the angle of inclination for providing a stable film-cutting operation, the above-mentioned range of inclination allows a suitable amount of air to enter between the base film 1 and the color resist layer 4, thereby making it possible to carry out a smooth separating process in the succeeding step. Here, in the above-mentioned device, the cutting operation is carried out by inclining the blade 26 toward the substrate rear-end 9b side by approximately 5° with respect to the direction perpendicular to the blade 26.

TABLE 4

| | Angle of Inclination of Blade Top [°] | | | | | | |
|---|---|---|---|---|---|---|---|
| | 0 | 1 | 3 | 5 | 7 | 10 | 15 | 20⁻ |
| Lifted State of Base Film | x | ○ | ⊙ | ⊙ | ⊙ | ⊙ | ⊙ | ⊙ |
| Stability of Film Cutting | ⊙ | ⊙ | ⊙ | ⊙ | ⊙ | ○ | x | x |

In Table 4, in the row for evaluation of "the lifted state of the base film", x represents the fact that no lifted state occurs between the base film 1 and the color resist layer 4, resulting in a separation of the color resist layer 4 during the separating process of the base film 1, ○ represents the fact that the width of the lift of the base film 1 is as small as 1 to 2 mm with the result that no margin is provided, and ⊙ represents the fact that the width of the lift of the base film 1 is suitably set at 2 to 4 mm in a desirably manner.

Moreover, in the row for evaluation of "the stability of film cutting" in Table 4, x represents the fact that peeling of the color resist layer 4 from the substrate 9 occurs resulting in scattering of cutting dusts during the separating process of the base film 1, ○ represents the fact that although no peeling of the color resist layer 4 occurs, cutting dusts of the base film 1 tends to be generated, and ⊙ represents the fact that neither peeling of the color resist layer 4 nor generation of cutting dusts of the base film 1 occurs, resulting in a desirable operation.

Moreover, during the cutting operation, the proximity of the cutting section 30 is cooled to a temperature in the range of 23 to 35° C. by the above-mentioned water-cooling mechanism installed in the receiving base 21. This arrangement is made so as to prevent peeling and unevenness of the film 10, and also to avoid degradation in cutting precision and short service life of the blade 26 due to adhesion of the film 10 to the blade 26, etc. Here, as shown in Table 5, consideration is given to a smooth progress to the separating process in the succeeding step and a preferable separating operation of the base film 1, and also to the efficiency and practicability of the operation. The temperature of the proximity of the cutting section 30 is preferably set in the range of 0° to 35° C. in which it is possible to avoid adhesion of dew or frost. In the present cutting operation, the proximity of the cutting section is cooled to a temperature in the range of 23° to 35° C. by circulating cooling water having a temperature in the range of 10° to 20° C. through the receiving base 21. However, the cooling method is not intended to be limited to a method using the receiving base 21; and a cooling means may be provided at the transport section from the laminating device to the cutting device, or such a cooling means and the cooling mechanism using the receiving base 21 may be combined.

TABLE 5

| | Substrate Temperature [° C.] | | | | | | |
|---|---|---|---|---|---|---|---|
| | 21 or less | 23 | 25 | 27 | 30 | 35 | 40 or more |
| Stability of Cutting of Extruded Film | ⊙ | ⊙ | ⊙ | ⊙ | ⊙ | ○ | x |
| Stability of Base-Film Separation | ⊙ | ⊙ | ⊙ | ⊙ | ⊙ | ○ | x |
| Through put & Device Construction | x | ○ | ⊙ | ⊙ | ⊙ | ⊙ | ⊙ |

In Table 5, in the row for evaluation of "the stability of cutting of extruded film", x represents the fact that upon cutting the extruded film 10, the color resist layer 4 is separated from the substrate 9, resulting in scattering of resist dusts in the eliminating process of the extruded film 10 and the separating process of the base film 1, ○ represents the fact that although no separation of the color resist layer 4 occurs, no margin for variations in the lamination conditions and film property is provided, and ⊙ represents the fact that no separation of the color resist layer 4 occurs with a sufficient margin for variations in the lamination conditions and film property.

Moreover, in Table 5, in the row for evaluation of "the stability of the base-film separation", x represents the fact that even the color resist layer 4 is separated together with the base film 1 in the separating process of the base film 1, ○ represents the fact that although only the base film 1 is separated, no margin for variations in the lamination conditions and film property is provided, and ⊙ represents the fact that only the base film 1 is separated with a sufficient margin for variations in the lamination conditions and film property.

Furthermore, in the row for evaluation of "the through put and the device construction" in Table 5, x represents failure in practical use with respect to the through put and device construction, since the temperature of the clean room is normally set at 23°C. in order to cool the substrate to a required temperature without the application of abrupt cooling, ○ represents the fact that both the through put and device construction are suitable for practical use, and ⊙ represents the fact that both the through put and device construction are suitable for practical use with high efficiency.

The cutting speed at the time of cutting the film 10 with the blade 26 is preferably set in the range of 10 mm/sec to 500 mm/sec, and more preferably in the range of 50 mm/sec to 100 mm/sec, as shown in Table 6. Here, the above-mentioned device is designed to shift the blade 26 at 70 mm/sec.

TABLE 6

|  | Shifting Speed of Blade (mm/sec) | | | | | | |
| --- | --- | --- | --- | --- | --- | --- | --- |
|  | ⁻5 | 10 | 50 | 100 | 300 | 500 | * |
| Stability of Film Cutting | ⊙ | ⊙ | ⊙ | ⊙ | ○ | ○ | x |
| Through Put | x | ○ | ⊙ | ⊙ | ⊙ | ⊙ | ⊙ |

*No examination is given to speeds higher than 500 mm/sec.

In Table 6, in the row for evaluation of "the stability of film cutting", x represents the fact that the top of the blade is not allowed to cut into the base film 1, resulting in a high possibility of the film 10 not being cut, ○ represents the fact that although the cutting operation of the film 10 is available, the width of lift of the base film 1 is as small as 1 to 2 mm with the result that no margin is provided, and ⊙ represents the fact that the cutting operation of the film 10 is preferably carried out with the width of lift of the base film 1 that is suitably set at 2 to 4 mm in a desirably manner.

Moreover, in the row for evaluation of "through put" in Table 6, x represents failure in practical use with respect to the through put, ○ represents the fact that although the through put is suitable for practical use, the application to a large substrate is difficult, and ⊙ represents the fact that the through put is suitable for practical use with high efficiency.

The results of research show that the pressurizing force of the blade 26 is preferably set approximately in the range of 400 gf to 800 gf. When the pressurizing force is too weak, the top of the blade is not allowed to cut into the base film 1, with the result that no cutting operation is available. In contrast, when the pressurizing force is too strong, the top of the blade is more susceptible to wear, resulting in a problem of service life and a high possibility of chipping of the blade top at the time of lowering of the blade 26 onto the substrate 9.

Figure 11:
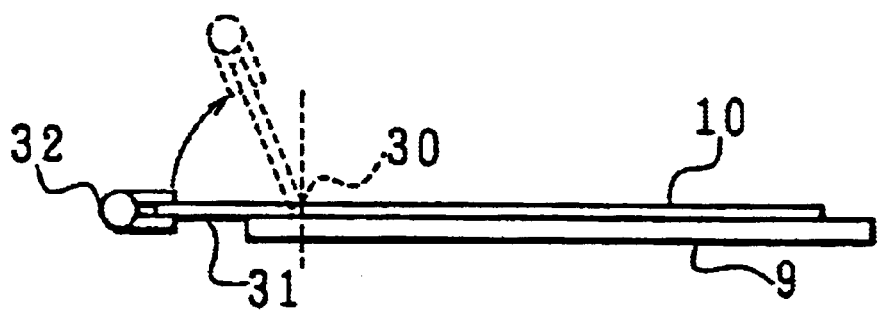
FIG. 11 is an explanatory drawing that shows a process for eliminating an extruding portion of the dry resist film after the cutting process.

After the cutting section 30 has been cut by the blade 26, the extruding portion 31 of the dry resist film 10 is eliminated by a removing means 32, as illustrated in FIG. 11. Upon eliminating the portion, it is essential to place the cutting section 30 of the dry resist film 10 on the substrate 9 with high linearity precision.

FIGS. 12(a) and 12(b) are explanatory drawings that show a state in which the extruding portion 31 of the dry resist film 10 have been eliminated.

In the present cutting and removing processes, upon cutting the dry resist film 10 at a position inside the substrate rear-end 9b, the cutting operation was carried out using a double-sided razor that had superior cutting property and durability as the blade 26, with the blade 26 being inclined with the specific angle, while the substrate being cooled to a temperature in the range of 23 to 35° C., and after the cutting operation, the extruding portion 31 was eliminated. With this arrangement, high quality finish of the color resist layer 4 was achieved even at the proximity of the cutting section 30, and the occurrence of lifting, peeling, scratches, etc. of the color resist layer 4 at the proximity of the cutting section 30 can be reduced.

Here, in the above-mentioned removing process, the extruding portion 31 is eliminated by the removing mechanism including the removing means 32 installed in the cutting device, and the same device is used for the cutting process and the removing process; however, the removing process may be carried out by using a device other than the device for the cutting process. From the viewpoint of the improvement, etc. of production efficiency, however, it is more preferable to carry out the cutting and removing processes by using the same device.

Next, an explanation will be given of a process for separating the base film 1 of the dry resist film 10 after the cutting and removing processes.

In the present separating process, at least one cut is made from one end of the dry resist film 10, and the base film 1 is separated by making the base film 1 and the color resist layer 4 apart from each other at the vicinity of the cut portion.

Moreover, even during the separating process, the substrate 9 is kept in a cooled state having a temperature in the range of 23 to 35° C. This arrangement is made so as to provide an appropriate cutting process, and also to prevent the intermediate layer, such as the oxygen-shielding layer, from being separated together with the separation of the base film 1.

FIG. 13 is a plan view that shows a state in which the dry resist film 10 is laminated onto the substrate 9 after the cutting and removing processes, and as illustrated in FIG. 13, prior to the present separating process, cuts 35 and 36 are made from one end 10a of the dry resist film 10. Reference numerals 37 and 38 show regions to which an adhesive tape 39, which will be described later, adheres.

Figure 14:
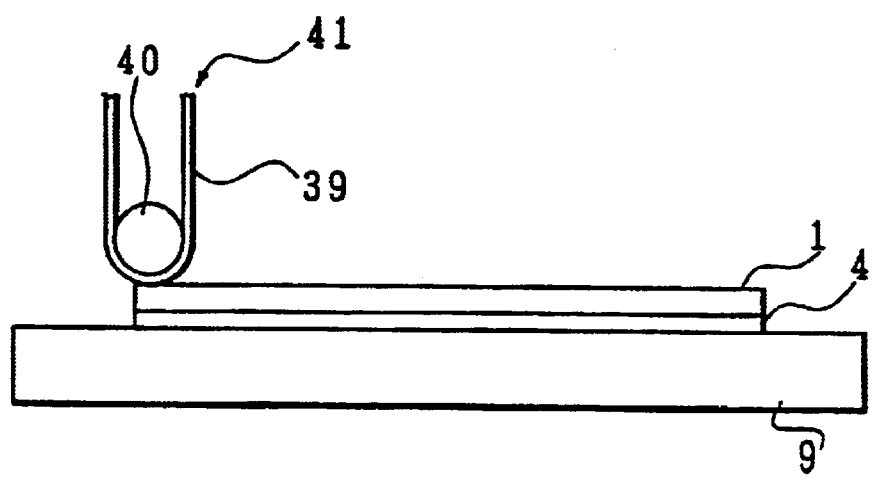
FIG. 14 is an explanatory drawing that shows a state in which adhesive tape is affixed on a base film upon starting the separating process.

As illustrated in FIG. 14, a separating device used in the present separating process is provided with two adhesive-tape support sections 41 in which the adhesive tape 39 passes over a rotary roller 40 (for convenience of explanation, FIG. 14 only shows one adhesive-tape support section 41). Upon separation, first, the adhesive tape 39 of each of the adhesive-tape support sections 41 is allowed to contact and adhere to the end portion 37a (or 38a) of the region 37 (or 38) on the base film 1.

Figure 15:
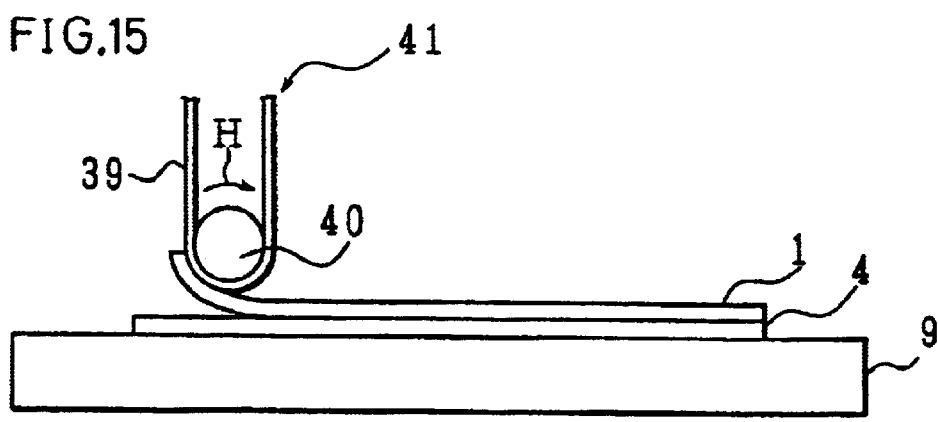
FIG. 15 is an explanatory drawing that shows a state in which a roller is rotated with the adhesive tape being affixed on the base film.

Next, as illustrated in FIG. 15, while the rotary roller 40 over which the adhesive tape 39 passes is being rotatively shifted in the direction of arrow H, the adhesive tape 39 is affixed to each of the entire regions 37 and 38. In this case, as illustrated in FIG. 15, the base film 1 also gradually increases the regions to which the adhesive tape 39 adheres from the end portions 37a and 38a, and is brought into a lifted state from the lower layer.

Figure 16:
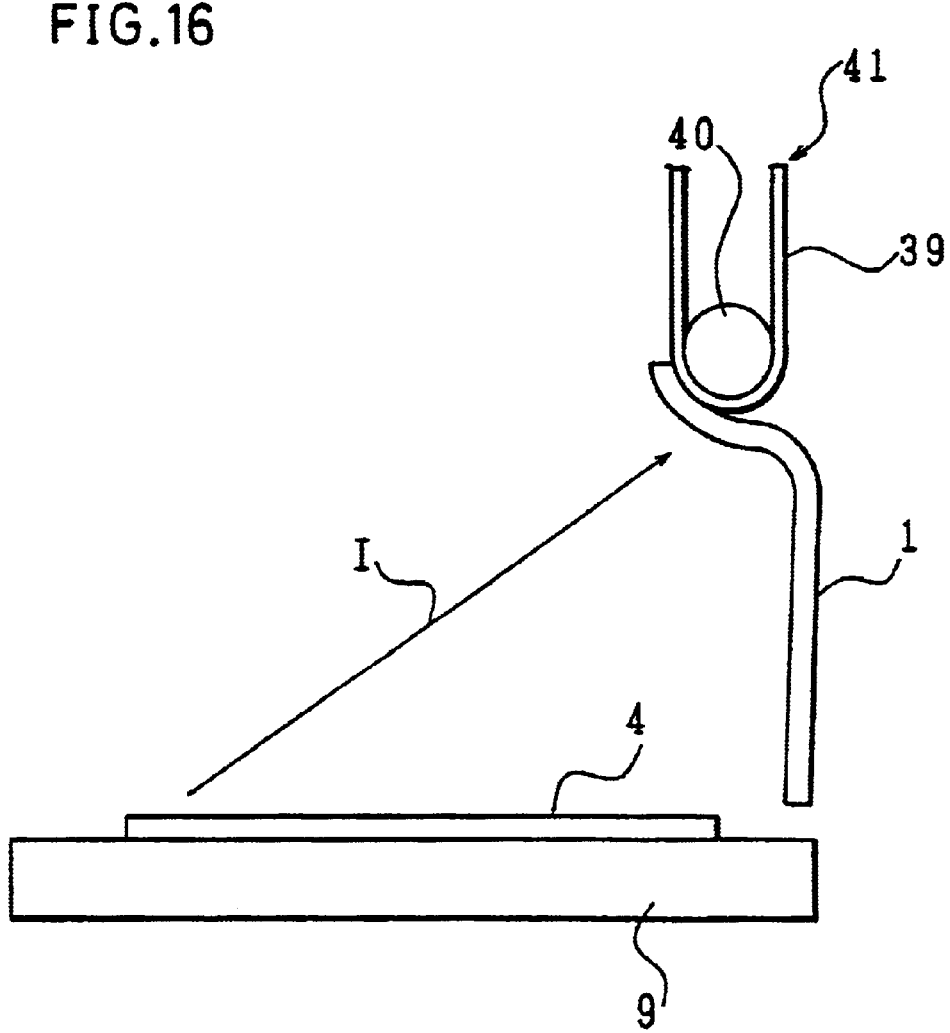
FIG. 16 is an explanatory drawing that shows a state in which the base film has been separated by shifting the adhesive tape diagonally upward.
Figure 17:
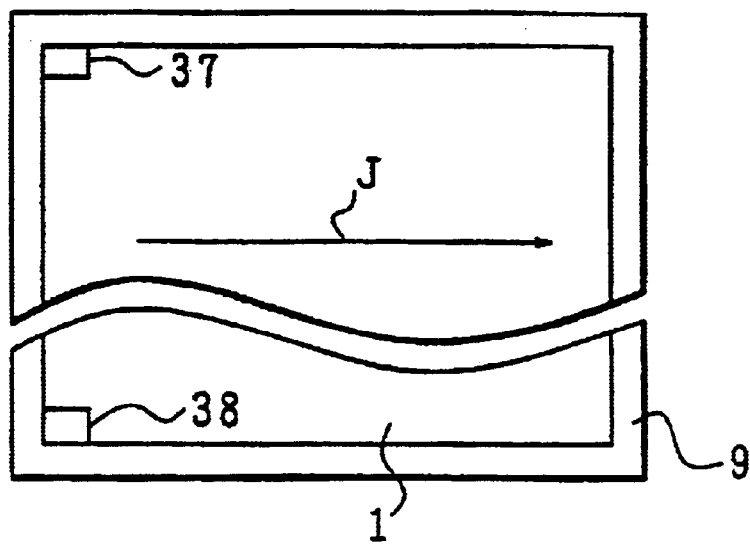
FIG. 17 is an explanatory drawing that shows the shifting direction of the adhesive tape.

Thereafter, as illustrated in FIG. 16, by shifting the respective adhesive-tape support sections 41 diagonally upward, that is, in the direction of arrow I, the base film 1 is entirely separated from the color resist layer 4. Here, as illustrated in FIG. 17, the direction of separation is indicated by the direction of arrow J, when viewed from above.

In the above-mentioned separating process, the cuts 35 and 36 are made in the regions 37 and 38 to which the adhesive tape 39 adhere so that air is preferably introduced between the base film 1 and the color resist layer 4; and the adhesive tape is also affixed thereto in a manner bridging the cut so that the belt-shaped support can be positively eliminated, thereby providing a superior separating process. Moreover, the separating process merely requires less separating force, and the separating force can be dispersed.

Since the separating process is carried out by gradually increasing the regions to which the adhesive tape 39 adheres from the side of the end portions 37a and 38a, it becomes possible to achieve a superior separating process with smoothness. Moreover, it is possible to prevent the generation of dusts derived from resin dusts, etc. from the color resist layer 4 during the separating process. Therefore, it becomes possible to carry out an effective separating process with high stability, without contamination. Furthermore, the amount of use of the adhesive tape 39 is comparatively low, thereby achieving a low-cost separating process.

The cuts 35 and 36 are made by slashing the dry resist film 10 with a length of approximately 5 mm to 10 mm from one end 10a thereof. Further, each of the cuts is formed at a position approximately 5 mm to 15 mm apart from each edge 10c (or 10d) of the dry resist film 10.

Moreover, the cuts 35 and 36 are formed by cutting the base film 1 and the color resist layer 4 by using the blade 26 of the cutting device that has been used in the aforementioned cutting and removing processes, that is, the double-sided razor made of stainless steel.

Here, the size of the cuts 35 and 36 and the area of the regions 37 and 38 to which the adhesive tape 39 adheres may be appropriately changed in accordance with factors, such as the area of the film.

In the above-mentioned separating device, the adhesive tape 39 that passes over the rotary roller 40 is continuously sent out so as not to reduce its adhesive strength, and is allowed to change its contact face with the base film 1.

Moreover, in the above-mentioned separating process, the separation is carried out by using the adhesive tape; however, another adhesive means, such as an adhesive roller, or another suction means, such as a vacuum chuck, may be used to carry out the separating process.

Furthermore, in the above-mentioned separating process, the base film 1 is separated from the color resist layer 4 by shifting the adhesive-tape support section 41 diagonally upward; however, the present invention is not intended to be limited by this arrangement, and the base film 1 and the color resist layer 4 may be separated from each other by shifting the stage on which the substrate is mounted or combining the shift of the stage and the shift of the adhesive-tape support section 41.

Figure 18:
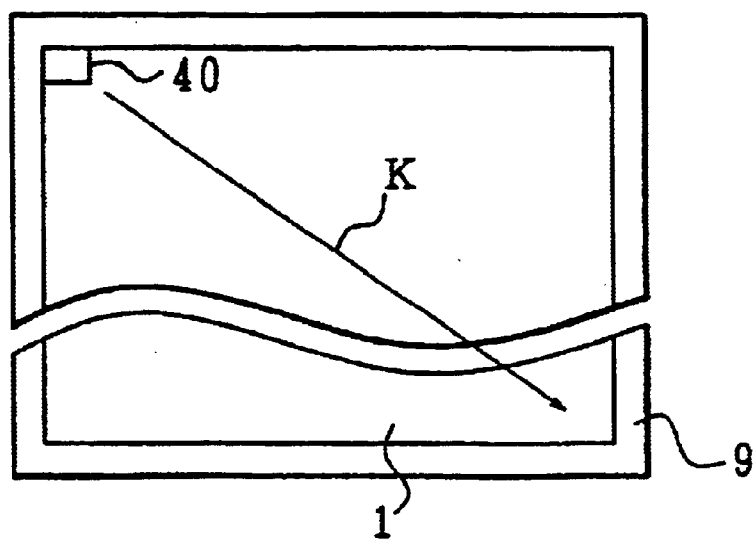
FIG. 18 is an explanatory drawing that shows the shifting direction of the adhesive tape in the case when the separation is carried out with the adhesive tape being affixed on one portion.
Figure 19:
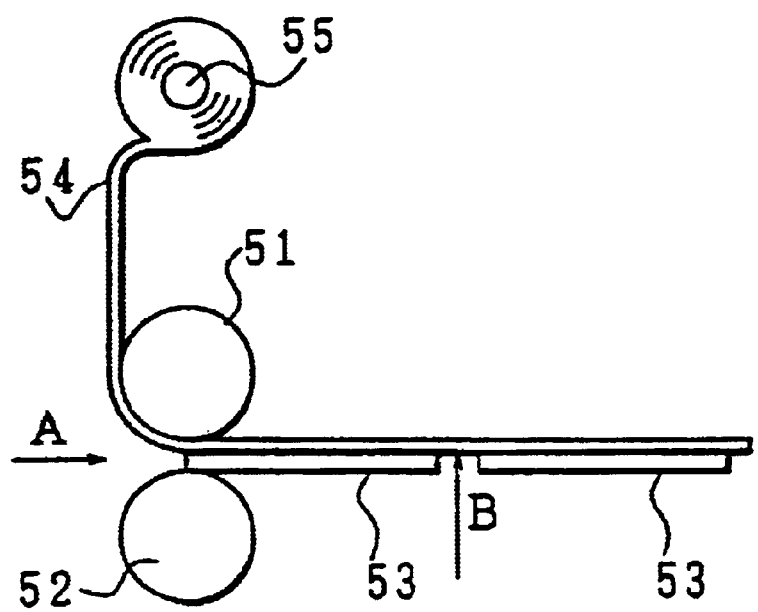
FIG. 19 is a drawing that shows the construction of a conventional continuous laminating device.
Figure 20:
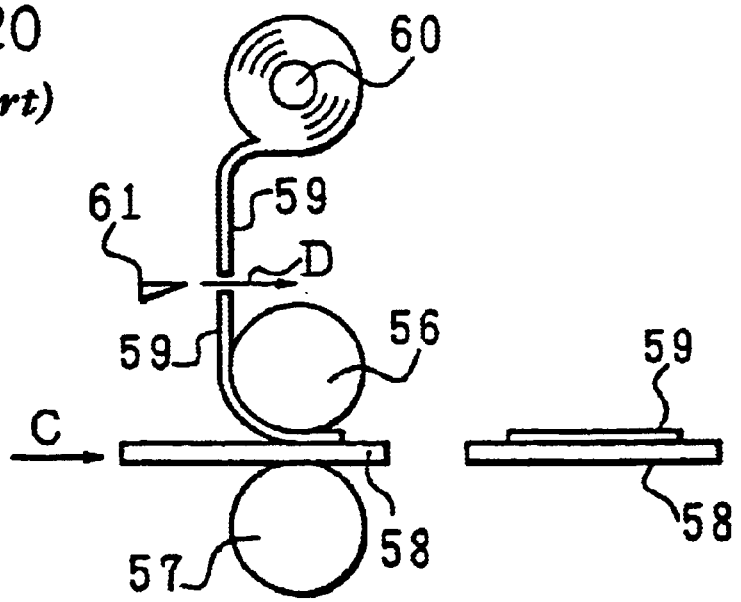
FIG. 20 is a drawing that shows the construction of a conventional intermittent laminating device.

As illustrated in FIG. 18, the region 40 to which the adhesive tape 39 adheres may be provided as one portion, and the separation may be carried out in the direction of arrow K.

As described above, the lamination method of the present invention, which is a method in which a film, formed by providing a resin layer on a belt-shaped support, is cut based upon the length of a substrate in the feeding direction, and press-bonded onto the substrate, and then the resin layer is transferred onto the substrate by separating the belt-shaped support, is provided with the steps of: in the cutting process, cutting the film so that the rear end of the film, after the press-bonding, extrudes from the rear end of the substrate by a predetermined width; and cutting the film again at a position inside the rear end of the substrate prior to separating the belt-shaped support after the film has been press-bonded so as to eliminate the portion of the film extruding from the substrate.

In the above-mentioned lamination method, the film is more preferably cut so as to allow the rear end of the film after the press-bonding to extrude by 30 mm to 60 mm from the rear end of the substrate. Thus, it becomes possible to reduce the amount of film use to a minimum, while positively preventing the generation of bubbles.

In the above-mentioned lamination method, upon cutting the film again at a position inside the rear end of the substrate, it is more preferable to cool the proximity of the cutting section to a temperature in the range of not less than 23° C. to not more than 35° C. This arrangement positively cures the resin in the proximity of the cutting section without softening; therefore, it becomes possible to reduce scattering and unevenness of the resin, and also to allow a cutting process with high linearity precision and an easier separating process.

Another lamination method of the present invention, which is a lamination method including a process in which, after a film, formed by providing a resin layer on a belt-shaped support, has been press-bonded onto a hard substrate, one portion of the film on the substrate is cut, is provided with the step of using a shaving-use blade made of stainless steel in the cutting process.

In the above-mentioned lamination method, upon cutting the film, it is more preferable to cool the proximity of the cutting section to a temperature in the range of not less than 23° C. to not more than 35° C. This arrangement makes it possible to further reduce scattering and unevenness of the resin, and also to allow a cutting process with high linearity precision. Further, it is possible to reduce adhesion of the resin film to the blade, to ensure a superior cutting property, and also to improve the service life of the blade.

In the above-mentioned lamination method, the cutting process is preferably carried out by inclining the blade so as to set the angle made by the blade top and the surface of the substrate in the range of 5° to 40°. This angle is a preferable angle of inclination for shifting the blade while maintaining a point contact between the blade and the substrate; therefore, it is possible to reduce scattering and unevenness of the resin, and consequently to allow a cutting process with high linearity precision.

In the above-mentioned lamination method, the cutting process, which is a cutting process for cutting the film at a position inside one end of the substrate along the one end so as to eliminate the portion of the film extruding from the substrate, is carried out while the blade is inclined toward the substrate rear-end side by 1° to 10° from the line perpendicular to the surface of the substrate. The setting of this angle of inclination allows an appropriate amount of air to enter between the belt-shaped support and the resin layer, and thus makes it possible to carry out the separating process smoothly in the succeeding step.

In the above-mentioned lamination method, the shifting speed of the blade at the time of cutting is preferably set in the range of 10 mm/sec to 500 mm/sec. This arrangement makes it possible to further reduce scattering and unevenness of the resin, and consequently allows a cutting process with high linearity precision.

Moreover, still another lamination method of the present invention, which is a lamination method in which a film, formed by providing a resin layer on a belt-shaped support, is cut based upon the length of a substrate in the feeding direction, and press-bonded onto the substrate, and then the resin layer is transferred onto the substrate by separating the belt-shaped support, is provided with the steps of: in the separating process, making at least one cut from one end of the film and separating the belt-shaped support by making the belt-shaped support and the resin layer apart from each other at the vicinity of the cut.

In the above-mentioned lamination method, upon making the cut, a shaving-use blade made of stainless steel is preferably used. Thus, it is possible to form a cut properly without raising dusts, such as glass and resin dusts, around.

In the above-mentioned lamination method, an adhesive tape is preferably bonded to an area on the belt-shaped support surrounding the cut in a manner so as to bridge the cut, and the belt-shaped support and the resin layer are separated from each other by shifting the adhesive tape in a direction parallel to the normal to the surface of the belt-shaped support. Thus, the proximity of the cut is bonded to the adhesive tape and the belt-shaped support is separated by raising the adhesive tape or other actions; therefore, the separation process is carried out mare easily without difficulty.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lamination method, which is a lamination method in which a film, formed by providing a resin layer on a belt-shaped support, is cut based upon the length of a substrate in a feeding direction, and press-bonded onto the substrate, and then the resin layer is transferred onto the substrate by separating the belt-shaped support, comprising the steps of:

in the separating process, making at least one cut from one end of the film in which the belt-shaped support and the resin layer are cut, so that at least one cut portion is present in the film and separating the belt-shaped support by making the belt-shaped support and the resin layer apart from each other at the vicinity of the cut portion.

2. The lamination method as defined in claim 1, wherein a blade made of stainless steel is used to make the cut.

3. A lamination method, which is a lamination method in which a film, formed by providing a resin layer on a belt-shaped support, is cut based upon the length of a substrate in a feeding direction, and press-bonded onto the substrate, and then the resin layer is transferred onto the substrate by separating the belt-shaped support, comprising the steps of:

in the separating process, making at least one cut from one end of the film and separating the belt-shaped support by making the belt-shaped support and the resin layer apart from each other at the vicinity of the cut, wherein an adhesive tape is bonded to an area on the belt-shaped support surrounding the cut in a manner so as to bridge the cut, and the belt-shaped support and the resin layer are separated from each other by shifting the adhesive tape in a direction parallel to the normal to the surface of the belt-shaped support.

4. The lamination method as defined in claim 1, wherein the substrate is kept in a cooled state having a temperature in a range of 23° C. to 35° C. upon separation.

5. The lamination method as defined in claim 1, wherein the cut is made by slashing the film with a length of approximately 5 mm to 15 mm from one end thereof.

6. A lamination method comprising:

bonding onto a substrate a film comprising a resin layer and a base layer; and separating the base layer from the resin layer so as to leave the resin layer on the substrate, wherein the separating comprises:

making at least one cut into the base layer and the resin layer at one end of the bonded film, so that at least one cut portion is present in the bonded film, and separating the base layer from the resin layer beginning in the vicinity of the cut portion, wherein the separating occurs at all the contacting interfaces of the base layer and the resin layer.

7. The lamination method as defined in claim 6, wherein the substrate is maintained at a temperature between 23° C. and 35° C. during the separating.

8. The lamination method as defined in claim 6, wherein the cut portion in the base layer and the resin layer of the bonded film is approximately 5 mm to 10 mm long.

9. The lamination method as defined in claim 6, wherein the cut portion in the base layer and the resin layer of the bonded film is approximately 5 mm to 15 mm from a side edge thereof.

10. The lamination method as defined in claim 6, wherein two cut portions are present in the base layer and the resin layer of the bonded film.

11. The lamination method as defined in claim 10, wherein each cut portion is approximately 5 mm to 10 mm long and is located approximately 5 mm to 15 mm from a respective side edge of the bonded film.

12. The lamination method as defined in claim 6, wherein the separating further comprises:

adhering adhesive tape to the base layer in the vicinity of the cut portion, wherein the base layer is separated from the resin layer by shifting the relative positions of the adhesive tape and the base layer.

13. The lamination method as defined in claim 12, wherein the adhesive tape is adhered to the base layer so as to bridge the cut portion.

14. The lamination method as defined in claim 6, wherein the base layer is separated from the resin layer using a suction device.

15. A lamination method comprising:

bonding onto a substrate a film comprising a resin layer and a base layer; and separating the base layer from the resin layer so as to leave the resin layer on the substrate, wherein the separating comprises:
- making at least one cut into the base layer and the resin layer at one end of the bonded film, so that at least one cut portion is present in the bonded film, and
- separating the base layer from the resin layer beginning in the vicinity of the cut portion, and wherein the resin layer comprises a photosensitive layer.

16. The lamination method as defined in claim 6, wherein the film further comprises an oxygen-shielding layer and a cushion layer interposed between the resin layer and the base layer.

17. The lamination method as defined in claim 6, wherein the laminating and separating are repeated for a plurality of different films.

18. A lamination method comprising:
- bonding onto a substrate a film comprising a resin layer and a base layer; and
- separating the base layer from the resin layer so as to leave the resin layer on the substrate, wherein the separating comprises:
- making at least one cut into the base layer and the resin layer at one end of the bonding film, and
- separating the base layer from the resin layer beginning in the vicinity of the cut,
- wherein the separating occurs at all the contacting interfaces of the base layer and the resin layer, and
- wherein the cut is a longitudinal cut substantially parallel to the sides of the film.

19. A lamination method comprising:
- bonding onto a substrate a film which has been cut based on the length of the substrate, the film comprising a resin layer and a base layer; and
- separating the base layer from the resin layer so as to leave the resin layer on the substrate, wherein the separating comprises:
- making at least one cut into the base layer and the resin layer at one end of the bonded film, so that at least one cut portion is present in the bonded film, and
- separating the base layer from the resin layer beginning in the vicinity of the cut portion, wherein the separating occurs at all the contacting interfaces of the base layer and the resin layer.

20. A lamination method comprising:
- bonding onto a substrate a film which has been cut based on the length of the substrate, the film comprising a resin layer and a base layer; and
- separating the base layer from the resin layer so as to leave the resin layer on the substrate, wherein the separating comprises:
- making at least one cut into the base layer and the resin layer at one end of the bonded film so that at least one cut portion is present in the bonded film, and
- separating the base layer from the resin layer beginning in the vicinity of the cut portion, and wherein the resin layer comprises a photosensitive layer.

* * * * *